May 16, 1933.  C. KELLEY  1,908,766
TIRE TOOL
Filed March 28, 1932  2 Sheets-Sheet 1
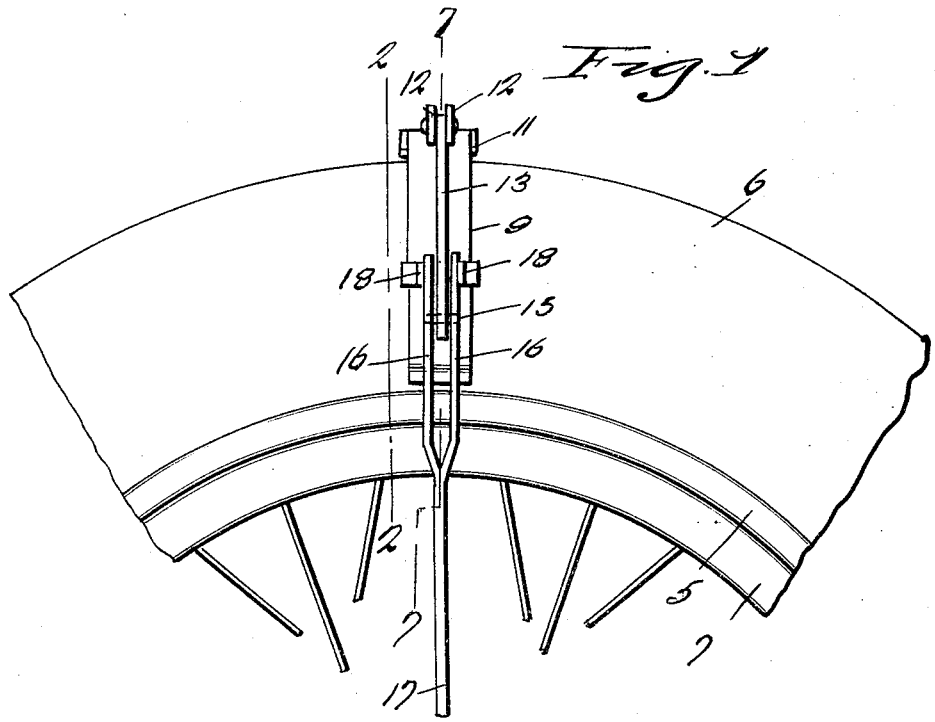
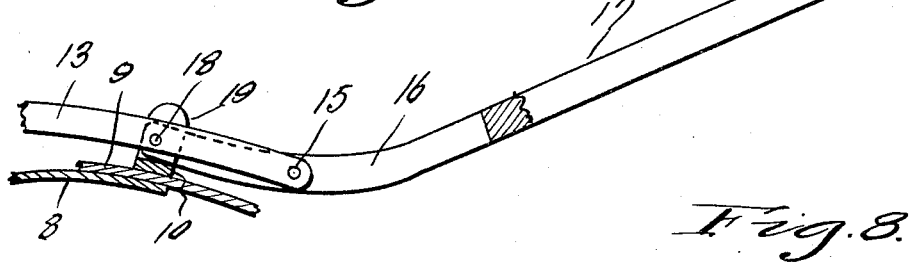
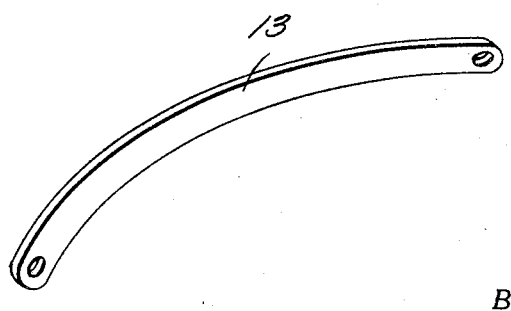
Inventor
Clarence Kelley
By Clarence A. O'Brien
Attorney

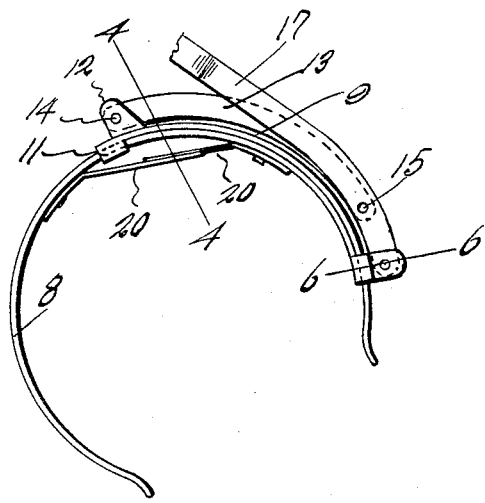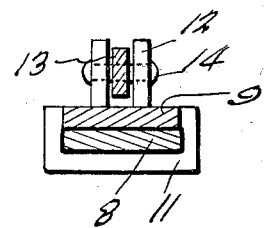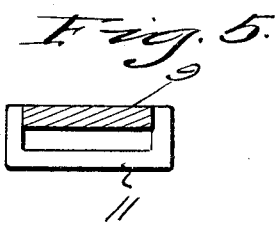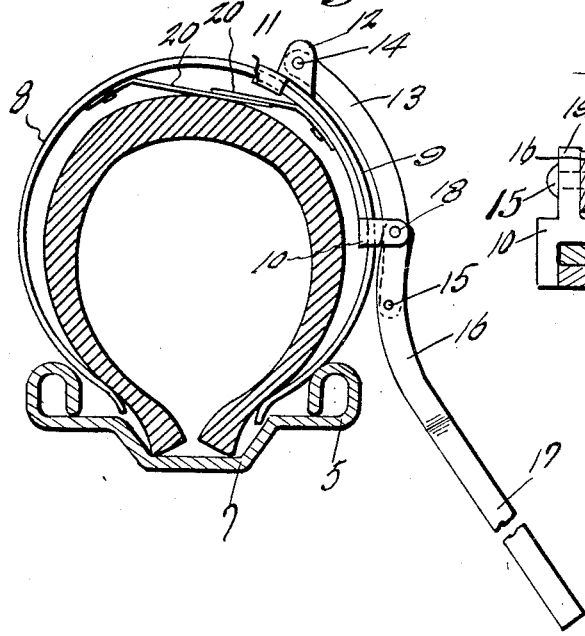

Patented May 16, 1933

1,908,766

UNITED STATES PATENT OFFICE

CLARENCE KELLEY, OF HUNTSVILLE, ARKANSAS

TIRE TOOL

Application filed March 28, 1932. Serial No. 601,658.

This invention appertains to new and useful improvements in tools for removing pneumatic tires from wheel rims.

The principal object of this invention is to provide a tool for readily manipulating pneumatic tire casings so as to drop the same and to permit removal thereof from drop center type rims.

Other important objects and advantages of the invention will become apparent to the reader of the following specification.

In the drawings:—

Figure 1 represents a fragmentary side elevational view of a pneumatic wheel showing the tool applied to the tire casing.

Fig. 2 represents a sectional view taken substantially on line 2—2 of Fig. 1.

Fig. 3 represents a side elevational view of the tool showing the same in expanded position.

Fig. 4 represents a cross sectional view taken substantially on line 4—4 of Fig. 3.

Fig. 5 represents a cross sectional view of one of the yoke sections.

Fig. 6 represents a cross sectional view taken substantially on line 6—6 of Fig. 3.

Fig. 7 represents a fragmentary detailed sectional view taken substantially on line 7—7 of Fig. 1.

Fig. 8 represents a perspective view of the arcuate link member.

Referring to the drawings wherein like numerals designate like parts, it can be seen in Fig. 1 that numeral 5 represents the drop center rim of a wheel carrying the pneumatic tire 6. The rim 5 is of the drop center 7 as is clearly apparent in both Figs. 1 and 2.

Referring now particularly to Figs. 2 and 3 it can be seen that the yoke which engages the tire casing 6 is made up of a pair of arcuate sections 8—9, the section 8 being substantially longer than the section 9, the end portion of the section 8 overlapping the section 9 and being provided with a guide 10 through which the section 9 is slidable, while the section 9 and its end overlapping the section 8 has a guide 11 through which the section 8 is slidable.

Adjacent the guide 11, on the section 9 are the ears 12 to which the arcuate shaped link member 13 is pivotally connected at one end as at 14. The opposite end of the link member 13 is pivotally connected as at 15 to the curved portion 16 of the hand lever 17, at a point slightly inwardly of the pivot point 18 at which point the curved portion 16 of the lever 17 is pivotally connected to the ears 19 which are on the guide 10. (See Fig. 6.)

A pair of spring members 20—20 extend in overlapping relation at their free ends, from points on the inner side of the section 8 and opposite sides of the guide 11, and these spring members, which are of the leaf type, simply serve to maintain the sections at their intermediate portions away from the tire casing, so that they can readily slide in cooperating relation without interference by the tires.

Obviously, the lever 17 is disposed in the position shown in Fig. 3, so that the yoke is extended preparatorily to the placing of the tool on the tire. After the tool has been placed on the tire, the lever 17 is drawn down to the position shown in Fig. 2, which moves the tire casing inwardly and drops the same into the drop center portion, as is clearly shown in Fig. 2.

While the foregoing specification sets forth the invention in specific terms, it is to be understood that numerous changes in the shape, size and materials may be resorted to without departing from the spirit and scope of the invention as claimed hereinafter.

Having thus described my invention what I claim as new is:—

1. A tire tool of the character described comprising a yoke divided into a pair of overlapping sections, guide means for slidably connecting the sections together, lever means between the sections whereby the sections can be expanded and contracted, said lever means comprising a hand lever pivotally connected at one end to one of the sections, and a link interposed between the said hand lever and the other section, said link being pivotally connected at one end to the other section and having its opposite end pivotally connected to said hand lever at a point intermediate the ends thereof.

2. A tire tool of the character described comprising a yoke divided into a pair of overlapping sections, guide means for slidably connecting the sections together, lever means between the sections whereby the sections can be expanded and contracted, and a resilient cross member between remote points on the inner side of one of the sections and engageable with the tire for spacing the bight portion of the yoke from the tire being manipulated.

In testimony whereof I affix my signature.

CLARENCE KELLEY.